United States Patent
Green et al.

(10) Patent No.: US 11,892,938 B2
(45) Date of Patent: Feb. 6, 2024

(54) CORRELATION AND ROOT CAUSE ANALYSIS OF TRACE DATA USING AN UNSUPERVISED AUTOENCODER

(71) Applicant: International Business Machines Corporation, Armonk, NY (US)

(72) Inventors: Matthew Green, Ashmore (AU); Narayana Aditya Madineni, Southport (AU); Michael W. Gray, Guanaba (AU); Leigh S. McLean, Nerang (AU)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 16/819,881

(22) Filed: Mar. 16, 2020

(65) Prior Publication Data

US 2021/0286707 A1  Sep. 16, 2021

(51) Int. Cl.
G06F 11/00 (2006.01)
G06F 11/36 (2006.01)
G06N 3/088 (2023.01)
G06N 3/045 (2023.01)

(52) U.S. Cl.
CPC ...... *G06F 11/3636* (2013.01); *G06F 11/3664* (2013.01); *G06N 3/045* (2023.01); *G06N 3/088* (2013.01)

(58) Field of Classification Search
CPC ............... G06F 11/079; G06F 11/3447; G06F 11/3452; G06F 11/3636; G06F 11/3664; G06N 3/0455; G06N 3/084; G06N 3/088
See application file for complete search history.

(56) References Cited

U.S. PATENT DOCUMENTS

| 7,992,040 B2 | 8/2011 | Agarwal et al. |
| 8,209,080 B2 | 6/2012 | Prokhorov et al. |
| 10,248,533 B1 | 4/2019 | Shah et al. |

(Continued)

FOREIGN PATENT DOCUMENTS

WO  2018235252 A1  12/2018

OTHER PUBLICATIONS

"Anomoly Detection", Wikipedia, retrieved from en.wikipedia.org/wiki/Anomaly_detection, Feb. 7, 2020.

(Continued)

*Primary Examiner* — Elmira Mehrmanesh
(74) *Attorney, Agent, or Firm* — Jordan T. Schiller

(57) ABSTRACT

An analyzer system inputs parameter values from trace files of a software application into an autoencoder. The analyzer system adjusts weights of the edges between nodes in the autoencoder until reconstruction errors in outputs are minimized. The analyzer system receives a selection of a parameter represented in an autoencoder. In response, the analyzer system identifies hidden layer nodes connected to an output node corresponding to the selected parameter and identifies other output nodes connected to the hidden layer nodes. The analyzer system retrieves weights assigned to edges between the hidden layer nodes and the other output nodes. The analyzer system calculates correlation values between the output node corresponding to the selected parameter and each of the other output nodes and outputs the correlation values. A user can use the correlation values to better direct the root cause analysis.

18 Claims, 11 Drawing Sheets

(56) References Cited

U.S. PATENT DOCUMENTS

| | | | | |
|---|---|---|---|---|
| 10,824,535 | B1* | 11/2020 | Shah | G06N 7/00 |
| 2011/0261049 | A1* | 10/2011 | Cardno | G06Q 40/04 |
| | | | | 345/419 |
| 2014/0218385 | A1* | 8/2014 | Carmi | G06T 7/136 |
| | | | | 345/620 |
| 2017/0068888 | A1* | 3/2017 | Chung | G06N 3/0454 |
| 2019/0188065 | A1* | 6/2019 | Anghel | G06F 11/0778 |
| 2019/0286506 | A1 | 9/2019 | Cheng et al. | |
| 2019/0294484 | A1 | 9/2019 | Luo et al. | |
| 2019/0356533 | A1* | 11/2019 | Vasseur | G06N 20/10 |
| 2020/0074281 | A1* | 3/2020 | Dindin | G06N 3/0454 |
| 2020/0076840 | A1* | 3/2020 | Peinador | G06N 3/088 |
| 2020/0134423 | A1* | 4/2020 | Shinde | G06F 11/3447 |
| 2020/0195683 | A1* | 6/2020 | Kuppa | G06F 21/6218 |
| 2020/0243359 | A1* | 7/2020 | Hao | H01J 37/32889 |

OTHER PUBLICATIONS

"Autoencoder", Wikipedia, retrieved from en.wikipedia.org/wiki/Autoencoder, Feb. 18, 2020.

'Log Analysis', Wikipedia, retrieved from en.wikipedia.org/wiki/Log_analysis, Apr. 9, 2019.

\* cited by examiner

TLS HANDSHAKE TRACE

| TIMESTAMP 901 | PARAMETER 902 | VALUE 903 |
|---|---|---|
| 1560826160 | TLS1.2 | TRUE |
| | TLS1.1 | FALSE |
| | TLS1.2 Cipher A | TRUE |
| | TLS1.2 Cipher B | TRUE |
| | TLS1.1 Cipher A | FALSE |
| | TLS1.1 Cipher B | FALSE |
| | TLS1.1 Cipher C | FALSE |
| | IO ERROR | FALSE |
| | NO CIPHER ERROR 904 | FALSE |

| TIMESTAMP | PARAMETER | VALUE |
|---|---|---|
| 1560827372 | TLS1.2 | TRUE |
| | TLS1.1 | TRUE |
| | TLS1.2 Cipher A | TRUE |
| | TLS1.2 Cipher B | TRUE |
| | TLS1.1 Cipher A | TRUE |
| | TLS1.1 Cipher B | TRUE |
| | TLS1.1 Cipher C | TRUE |
| | IO ERROR | FALSE |
| | NO CIPHER ERROR | FALSE |

FIG. 9

TLS HANDSHAKE TRACE

| TIMESTAMP | PARAMETER | VALUE |
|---|---|---|
| 1560826160 | TLS1.2 | TRUE (0.8467) 1002 |
| | TLS1.1 | FALSE (0.8556) |
| | TLS1.2 Cipher A | TRUE (0.6931) 1003 |
| | TLS1.2 Cipher B | TRUE (0.7007) |
| | TLS1.1 Cipher A | FALSE (-0.7540) 1004 |
| | TLS1.1 Cipher B | FALSE (-0.7388) |
| | TLS1.1 Cipher C | FALSE (0.173) |
| | IO ERROR | FALSE (0.112) |
| | NO CIPHER ERROR | FALSE (1) 1001 |

| TIMESTAMP | PARAMETER | VALUE |
|---|---|---|
| 1560827372 | TLS1.2 | TRUE (0.8467) |
| | TLS1.1 | TRUE (0.8556) |
| | TLS1.2 Cipher A | TRUE (0.6931) |
| | TLS1.2 Cipher B | TRUE (0.7007) |
| | TLS1.1 Cipher A | TRUE (-0.7540) |
| | TLS1.1 Cipher B | TRUE (0.7388) |
| | TLS1.1 Cipher C | TRUE (0.173) |
| | IO ERROR | FALSE (0.112) |
| | NO CIPHER ERROR | FALSE (1) |

| LEGEND | |
|---|---|
| | Highly Correlated |
| | Lightly Correlated |
| | Negatively Correlated |
| | Selected |

FIG. 10

US 11,892,938 B2

CORRELATION AND ROOT CAUSE ANALYSIS OF TRACE DATA USING AN UNSUPERVISED AUTOENCODER

BACKGROUND

Root cause analysis to identify problems from software application logs, or trace files, can be very time-consuming, especially when the software application is used in a heavy load production environment. With large trace files, it is difficult for a developer to quickly determine the root cause of abnormal behavior, errors, or defects of the application by manually examining the data in the trace files via an editor or viewer tool. For example, consider a trace file of a security software application which performs thousands of Transport Layer Security (TLS) handshakes. The application may be setting different configurations of inputs, such as protocol version, ciphers, and certificates, for running different handshakes. The trace files would record the parameters, including errors and results, of and from the handshake connections. For example, the trace files may record a "no ciphers" error only when both TLS 1.2 and TLS 1.1 are enabled and a particular cipher is not enabled. To find the correlations between the "no ciphers" error and the particular cipher or protocol being enabled or disabled through manual inspection is very time-consuming, since there are likely thousands of handshakes. The time required to find the correlations delays the ability to determine the root cause of the problems, and thus impacts the user's ability to correct the problems.

SUMMARY

Disclosed herein is a method for determining correlations in software application trace data for use in root cause analysis, and a computer program product and system as specified in the independent claims. Embodiments of the present invention can be freely combined with each other if they are not mutually exclusive.

According to an embodiment of the present invention, an analyzer system inputs parameter values from one or more trace files of a software application into the autoencoder. The analyzer system adjusts weights of the edges between nodes in the autoencoder until reconstruction errors in outputs of the autoencoder are minimized. The analyzer system sends the plurality of parameters represented in the autoencoder to a user interface and receives a selection of a parameter of a plurality of parameters represented in an autoencoder. In response, the analyzer system identifies one or more hidden layer nodes in the autoencoder connected to an output node in the autoencoder corresponding to the selected parameter. The analyzer system also identifies one or more other output nodes in the autoencoder connected to the one or more hidden layer nodes. The analyzer system retrieves weights assigned to edges between the one or more hidden layer nodes and the one or more other output nodes. The analyzer system calculates correlation values between the output node corresponding to the selected parameter and each of the other output nodes and outputs the correlation values. A user can use the correlation values to better direct the root cause analysis.

BRIEF DESCRIPTION OF THE DRAWINGS

FIG. 9 illustrates an example output display of represented parameters.

FIG. 10 illustrates an example output display of correlation values calculated by the analyzer system for a selected parameter.

DETAILED DESCRIPTION

Figure 1:
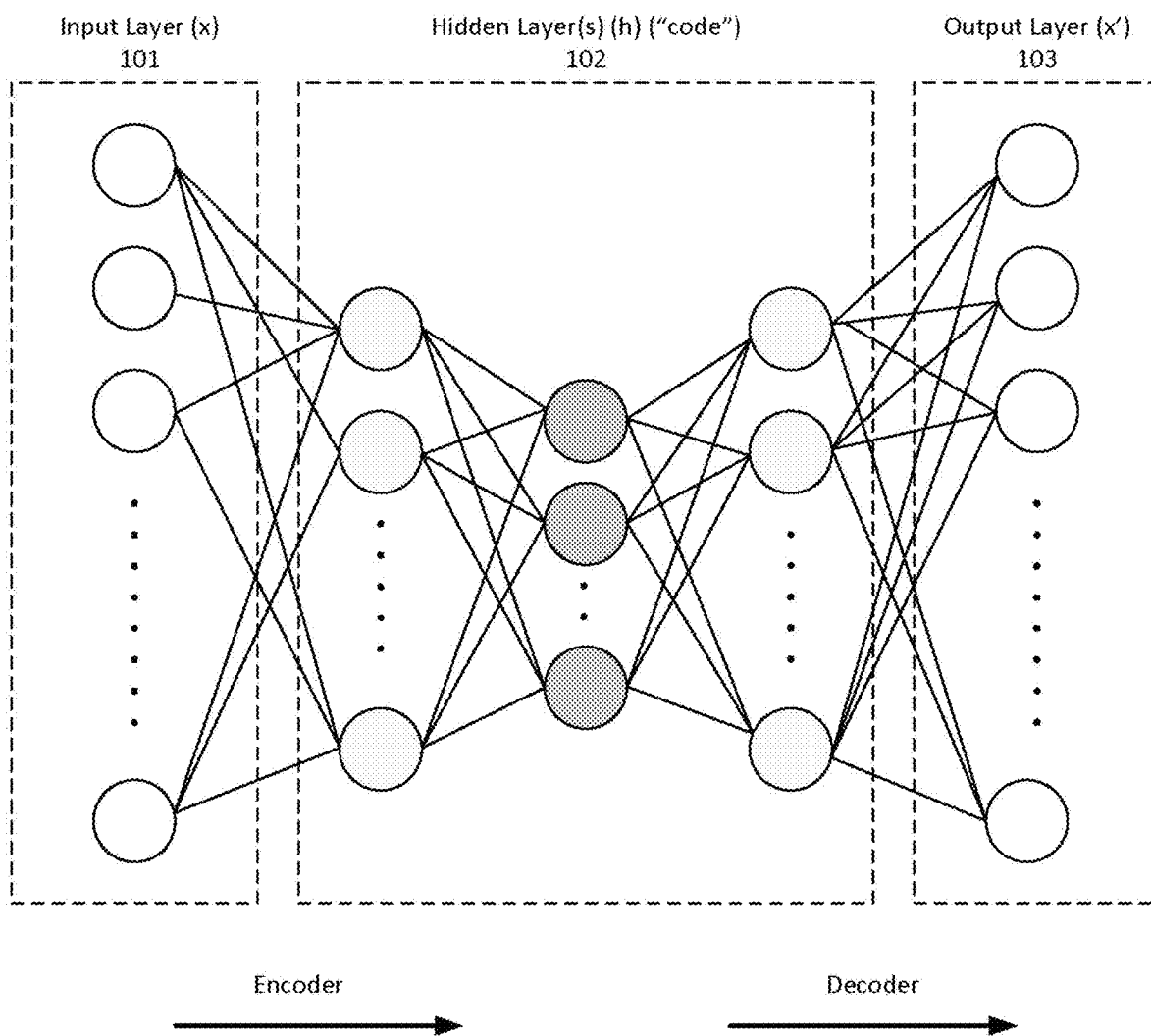
FIG. 1 illustrates a basic scheme of an autoencoder.

Embodiments of the present invention provide an analyzer system for determining correlations in software application trace data using an autoencoder. An autoencoder is a neural network that learns to copy its input to its output. The autoencoder includes two main parts: an encoder that maps an input into a "code"; and a decoder that maps the code to a reconstruction of the original input. FIG. 1 illustrates a basic scheme of an autoencoder. The autoencoder 100 includes an input layer 100 with a set of input nodes, an output layer 103 with a set of output nodes, and one or more hidden layers 102 connecting the input nodes to the output nodes. The hidden layers 102 are also known as the "code". The output layer 103 has the same number of nodes as the input layer 101. Instead of predicting target values given input values, the autoencoder 100 has the purpose of reconstructing its inputs, i.e., minimizing the difference between the input and the output. The autoencoder 100 is thus an unsupervised learning model, i.e., it does not require labeled inputs to enable learning. The encoder portion of the autoencoder 100 maps the input (x) into the code 102 using an activation function (a). The activation function defines the output of a node given an input or set of inputs. Initial weights are assigned to each edge between a node and a node of a previous layer. The weights are updated iteratively during training through techniques, such as backpropagation. Backpropagation computes the gradient of a loss function with respect to weights of the nodes per a chain rule (for a multi-layer code) and a delta rule (for a single-layer code). The chain rule uses a formula to compute the derivative of a composite function. The delta rule is a gradient descent learning rule for updating the weights of inputs to artificial neurons in a single-layer neural network. The decoder portion of the autoencoder 100 maps the code to a reconstruction (x') with the same shape as the input (x) using another activation function (σ'). The activation function for the decoder (σ') may be related or unrelated to the activation function for the encoder (a). The autoencoder 100 is trained to minimize the reconstruction errors or "loss" at the output layer 103. Through iterations to minimize the reconstruction errors, the autoencoder 100 learns the most important attributes of the input data and how best to reconstruct the original input, i.e., learning and describing the latent attributes of the input data.

Embodiments of the present invention leverage the above characteristic of an autoencoder to determine correlations in software application trace data for use in root cause analysis. Data concerning operations available in the trace files are used to train an autoencoder to perform causal and correlation analysis. The input layer of the autoencoder includes nodes representing parameters, including inputs, results, and errors, from the trace files. The nodes of the hidden layers represent features and correlations from the input nodes. The output layer is reconstructed from the nodes in the hidden layers and contains the same number of nodes as the input layer. Each node in the network is associated with a weight computed using an activation function and weights of nodes from the previous layer. The weights of the output nodes are used to determine the correlation between parameters to perform root cause analysis. The weights of the nodes in the hidden layers can be further evaluated to identify complex relationships between the inputs and errors. A viewer tool is integrated with the autoencoder, where parameters represented in the autoencoder are displayed on a user interface. Through the user interface, a selection of a particular parameter is received, and in response, other parameters correlated with the selected parameter are graphically highlighted. Different graphical cues can be used to represent the strength of the correlation. The user can then use the information conveyed to perform a root cause analysis.

Figure 2:
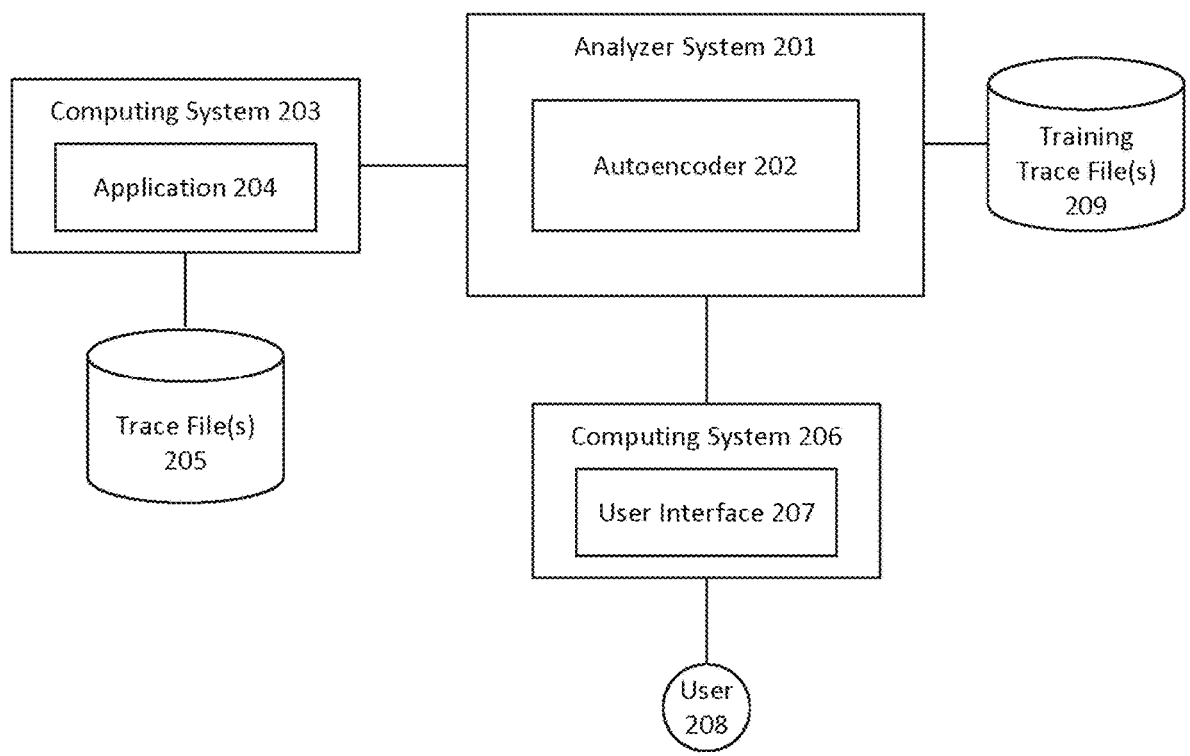
FIG. 2 illustrates an analyzer system for identifying correlations in software application trace data for use in root cause analysis, according to some embodiments.

FIG. 2 illustrates an analyzer system for identifying correlations in software application trace data for use in root cause analysis, according to some embodiments. The analyzer system 201 creates and trains an autoencoder 202 using training trace files 209 associated with an application 204. After the autoencoder 202 is trained, the analyzer system 201 receives one or more trace files 205 from a computing system 203 that executes the application 204. As the application 204 executes, the application 204 performs numerous handshakes. The parameters for the handshakes, such as protocol version, ciphers, certificates, and errors, are recorded in one or more trace files 205. Parameters in the trace files 205 are sent to the analyzer system 201 and input into the autoencoder 202. Parameters represented in the autoencoder 202 are sent to another computing system 206, which displays the parameters to a user 208 via a user interface 207. Upon receiving a selection of one of the parameters from the computing system 206, the analyzer system 201 uses the autoencoder 202 to analyze the inputs to determine the correlations between the selected parameter and other parameters. The correlations are then sent to the computing system 206 to be displayed via the user interface 207.

Figure 3:
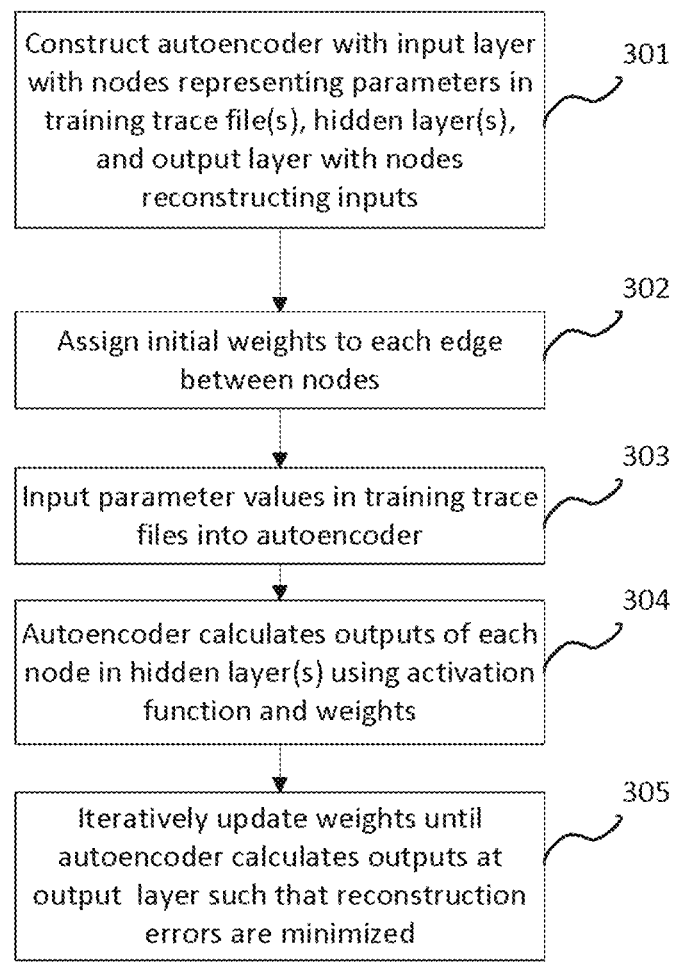
FIG. 3 illustrates a method for training an autoencoder according to some embodiments.

FIG. 3 illustrates a method for training an autoencoder according to some embodiments. The analyzer system 201 constructs the autoencoder 202 with an input layer with nodes representing the parameters in a set of training trace files 209, one or more hidden layers, and an output layer with nodes that reconstructs the inputs (301). The analyzer system 201 assigns initial weights to each edge between nodes (302). The analyzer system 201 inputs parameter values in the training trace files 209 into the autoencoder 202 (303). The autoencoder 202 calculates the outputs of each node in the hidden layer(s) and the output layer using an activation function and the weights (304). The analyzer system 201 then iteratively updates the weights until the autoencoder 202 calculates the outputs at the output layer such that reconstruction errors are minimized (305). In some embodiments, techniques, such as backpropagation, are used to adjust the weights. The features of the autoencoder 202, such as the initial weights, the training algorithm, and the activation function, can be configured according to the needs of the application 204, types of inputs, and possible outcomes.

Figure 4:
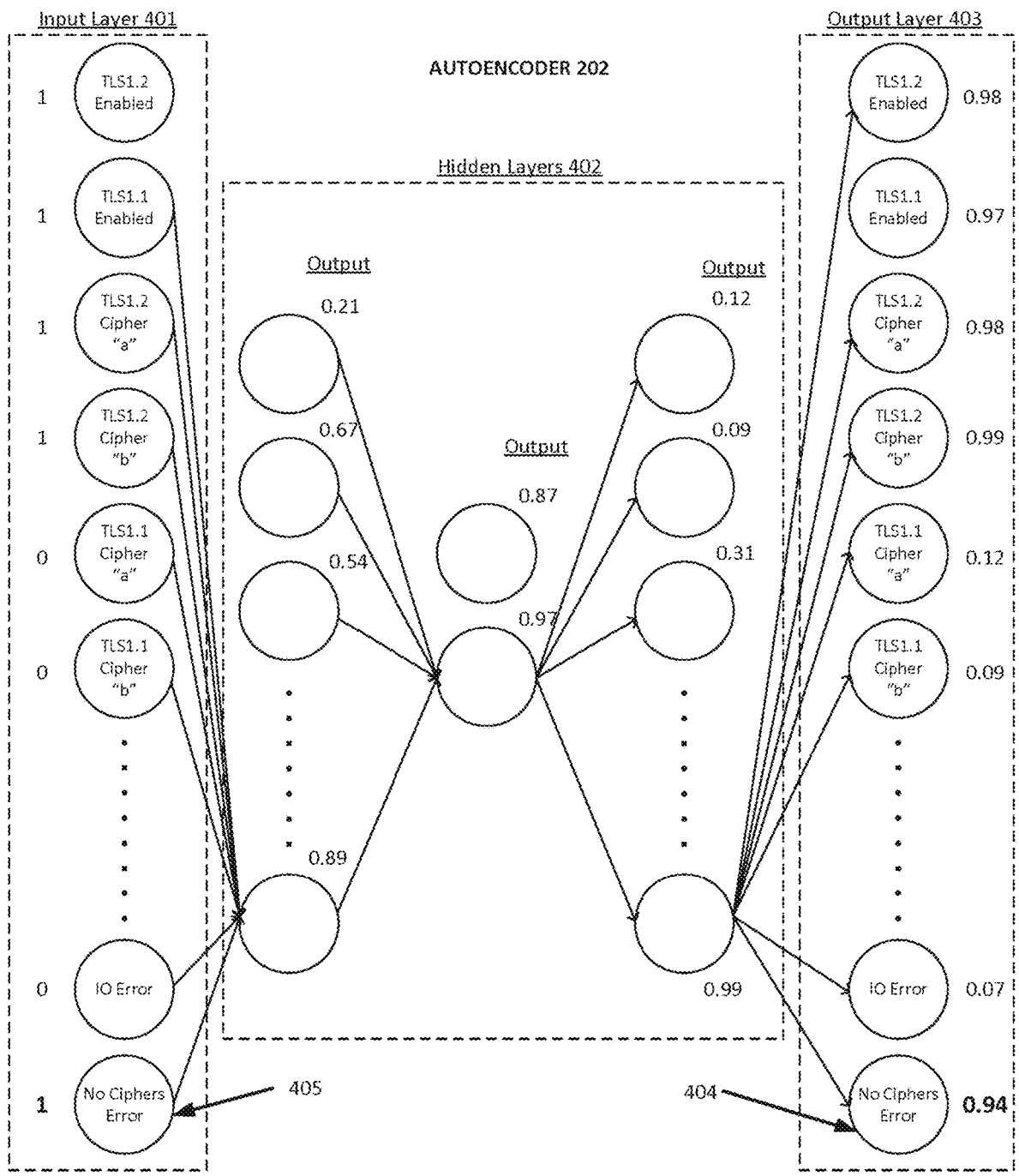
FIG. 4 illustrates an example trained autoencoder.
Figure 5:
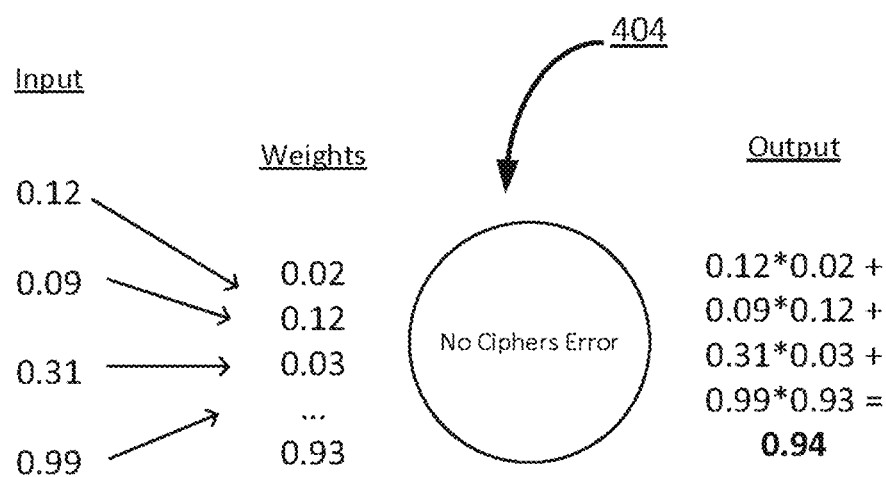
FIG. 5 illustrates an example output node in the trained autoencoder corresponding to an input node.

FIG. 4 illustrates an example trained autoencoder. In this example, the autoencoder 202 is run with inputs '111-100 . . . 01'. Each node in the output layer 403 corresponds to a node in the input layer 401. The output of each node in the hidden layers 402 are calculated using the activation function and the output of connected nodes and their associated weights in the previous layer. The weights assigned to the edges between nodes have been iteratively updated until the final outputs at the output layer 403 are very close to the inputs, i.e., until the errors in reconstructing the inputs are minimized. FIG. 5 illustrates an example output node 404 in the trained autoencoder 202 corresponding to the 'no ciphers error' input node 405. The weights assigned to edges connected the 'no ciphers error' input node 405 and the 'no ciphers error' output node 404 are adjusted until the output of the 'no ciphers error' output node 404 is calculated with minimal error, which in this example is the value of '0.94'. For purposes of illustration, an example activation function used in calculating the output of nodes is a simple linear activation function that multiplies each input of a node by its associated weight and adds the products together. In the example illustrated in FIG. 5, the inputs to the 'no ciphers error' node 404 are {0.12, 0.09, 0.31, . . . 0.99}. The weights of edges assigned to the inputs are {0.02, 0.1, 0.03 . . . 0.93}. The output for the 'no ciphers error' output node 304 is calculated as 0.12*0.02+0.09*0.12+0.31*0.03+0.99*0.93=0.94. Once trained, the autoencoder 202 is ready to be used in correlation analysis of data associated with the execution of the application 204.

Figure 6:
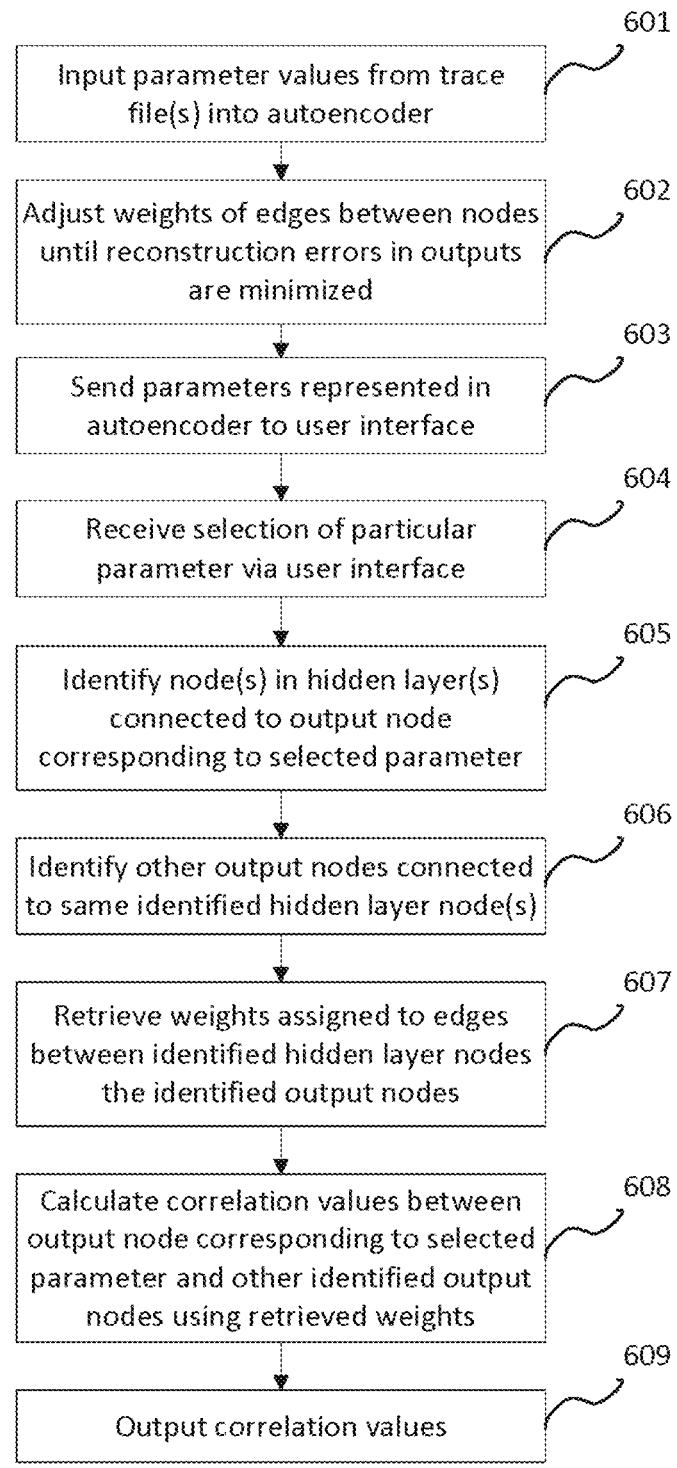
FIG. 6 illustrates a method for determining correlations in software application trace data for use in root cause analysis, according to some embodiments.

FIG. 6 illustrates a method for determining correlations in software application trace data for use in root cause analysis, according to some embodiments. The analyzer system 201 receives one or more trace files 205 for the application 204 from the computing system 203. The analyzer system 201 inputs parameter values from the trace files 205 into the autoencoder 202 (601). The autoencoder 202 processes the inputs through the hidden layers 402 and calculates the outputs at the output layer 403, as described above. The analyzer system 201 adjusts the weights of the edges between the nodes in the autoencoder 202 until the reconstructions errors in the outputs are minimized (602). The parameters represented in the autoencoder 202 are sent to the computing system 206 to be displayed to the user 208 via a user interface 207 (603). The user 208 can review the parameters and select a particular parameter of interest via the user interface 207. The analyzer system 201 receives the selection of the particular parameter from the computing system 206 (604). In response, the analyzer system 201 identifies one or more nodes in one or more hidden layers connected to the output node corresponding to the selected parameter (605). The analyzer system 201 identifies other output nodes connected to the same identified hidden layer node(s) (606). The analyzer system 201 retrieves the weights assigned to the edges between the identified hidden layer node(s) and the identified output nodes (607). The analyzer system 201 calculates correlation values between the output node corresponding to the selected parameter and the other identified output nodes using the retrieved weights (608). The correlation values are output to the computing system 206 to be displayed to the user 208 via the user interface 207

(609). The user 208 can use the correlation values to determine the root cause of an error or result.

Figure 7:
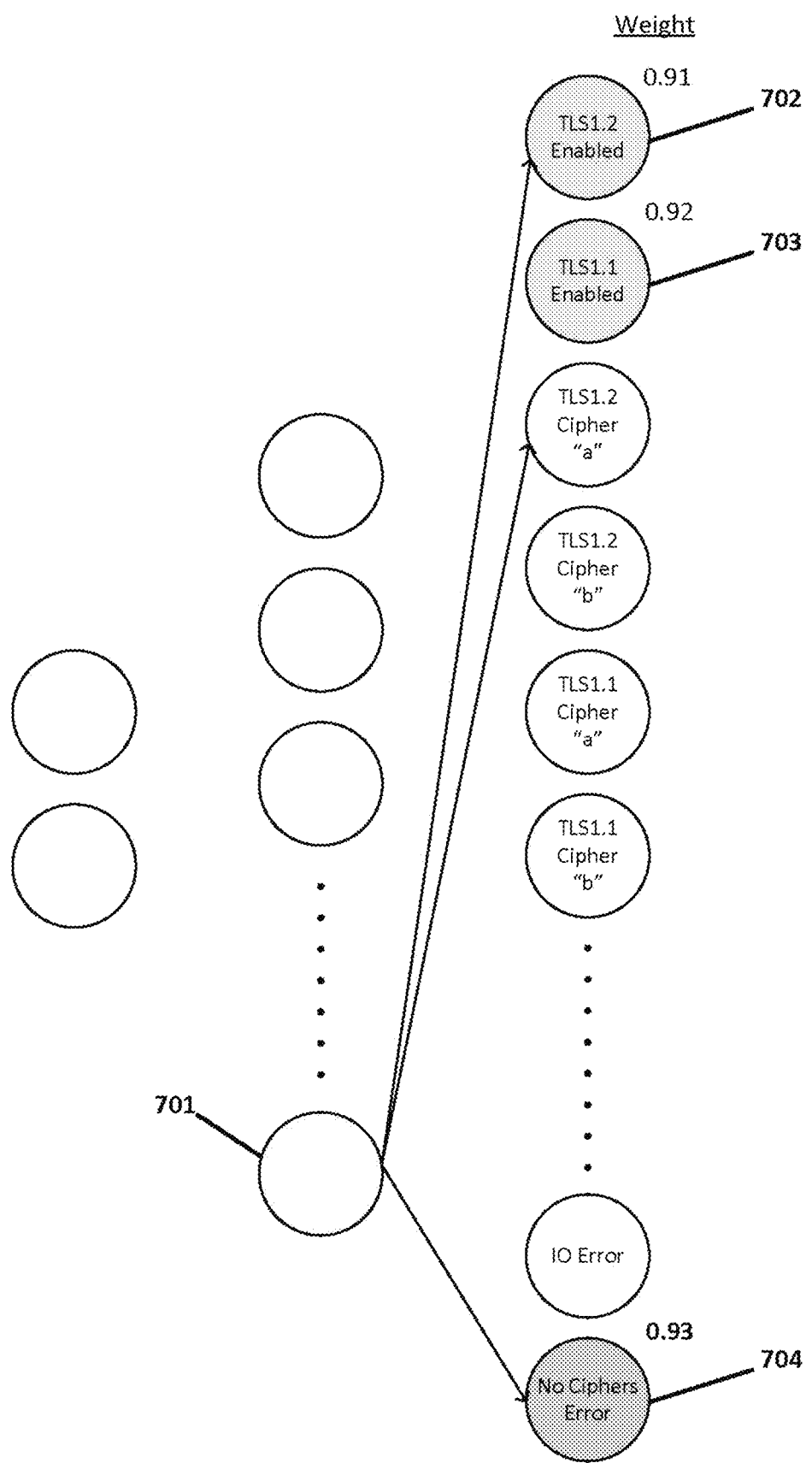
FIG. 7 illustrates a single layer correlation analysis using the autoencoder according to some embodiments.

FIG. 7 illustrates a single layer correlation analysis using the autoencoder according to some embodiments. Referring to both FIGS. 6 and 7, assume that the 'No Ciphers Error', represented by output node 704, is selected (604). In response, the analyzer system 201 identifies the node 701 in the hidden layer connected to the output node 704 (605). The analyzer system 201 identifies the other output nodes, including nodes 702 and 703, connected to the hidden layer node 701 (606). The analyzer system 201 retrieves the weights assigned to the edges between the hidden layer node 701 and the output nodes 702, 703, and 704 (607). The analyzer system 201 calculates correlation values between output node 704 and the other output nodes 702 and 703 using the retrieved weights (608). In this example, the weights are {0.91, 0.92, 0.93}, and the correlation values are calculated as the product of the weights. For example, the correlation between the 'TLS1.2 Enabled' node 702 and the 'No Ciphers Error' node 704 is 0.91*0.93=0.8463. Similarly, the correlation between the 'TLS1.1 Enabled' node 703 and the 'No Ciphers Error' node 704 is 0.92*0.93=0.8556. Other types of activation function may also be used. These correlation values are then output by the analyzer system 201 (609). In the example illustrated in FIG. 7, the output layer nodes 702, 703, and 704 are weighted heavily towards the hidden layer node 701. This infers that the autoencoder 202 has induced a high correlation between these output nodes 702, 703, and 704. The user 208 can use this information to better direct the root cause analysis.

Figure 8:
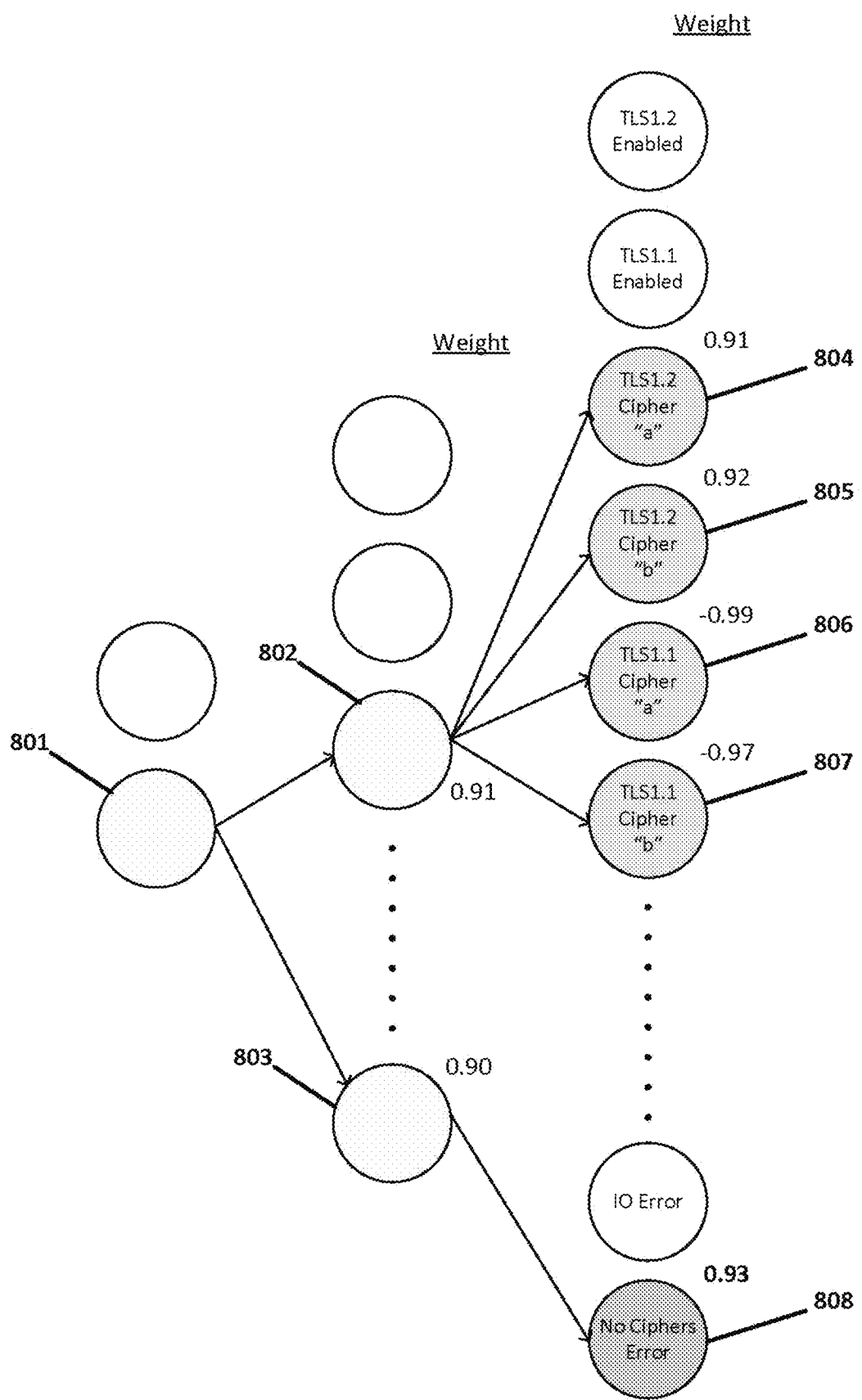
FIG. 8 illustrates a multiple layer correlation analysis using the autoencoder according to some embodiments.

FIG. 8 illustrates a multiple layer correlation analysis using the autoencoder according to some embodiments. Referring to both FIGS. 6 and 8, assume that the 'No Ciphers Error', represented by output node 808, is selected (604). In response, the analyzer system 201 identifies node 803 in the hidden layer connected to the output layer node 808 (605). The analyzer system 201 identifies the other output nodes connected to hidden layer node 803 and calculates the correlation values, as described above in the example illustrated in FIG. 7 (606-608). The analyzer system 201 can also observe more complex relationships in the autoencoder 202 by identifying the hidden layer node 801 in a previous layer to which the hidden layer node 803 is connected and identifying other hidden layer node(s) 802 connected to the same hidden layer node 801. The hidden layer nodes 802 and 803 are referred to herein as intermediate hidden layer nodes. The analyzer system 201 then identifies output nodes 804, 805, 806, and 807 connected to the intermediate hidden layer node 802. The analyzer system 201 retrieves the weights for output nodes 804-807 and the weights for the intermediate hidden layer nodes 802-803 based on their connection to hidden layer node 801. The analyzer system 201 calculates the correlation values between each of the output nodes 804-807 and the output node 808 using the retrieved weights. In this example, the correlation values are calculated as the product of the weights of the relevant output nodes and the intermediate hidden layer nodes to which they are connected. For example, the correlation between the 'TLS1.1 Cipher "a"' node 806 and the 'No Ciphers Error' node 808 is the product of the node 808 weight, the node 803 weight, the node 802 weight, and the node 806 weight, or 0.93*0.90*0.91*-0.99=-0.7540. These correlation values are then output by the analyzer system 201 (609).

FIG. 9 illustrates an example output display of represented parameters. For TS handshakes in the trace files 205, a list of parameters 902 with associated timestamps 901 and values 903, are displayed via the user interface 207. A user 208 can select the No Cipher Error parameter 904, for example, via the user interface 207. FIG. 10 illustrates an example output display of correlation values calculated by the analyzer system 201 for the no cipher error parameter. In this example, the parameters values are displayed with the correlation values in parenthesis. For example, the "No Cipher Error=False" parameter 1001 can be selected, and in response, the analyzer system 201 calculates the correlations between this parameter 1001 and the other parameters. As illustrated, the correlation of the "No Cipher Error=FALSE" parameter 1001 to the "TLS1.2=TRUE" parameter 1002 is calculated to be 0.8467, to the "TLS1.2 Cipher A=TRUE" parameter 1003 is calculated to be 0.6931, and to the "TLS1.1 Cipher A=FALSE" parameter 1004 is calculated to be -07540. Graphical cues can be incorporated into the display to convey the level of correlation. The various levels of correlation can be configured using threshold values, where correlation values exceeding a first threshold is determined to be 'highly correlated', correlation values exceeding a second threshold but below the first threshold is determined to be 'lightly correlated', and correlation values below the second threshold is determined to be 'negatively correlated'. The selected parameter can also be displayed with a graphical cue. The user 208 can use this information to better direct the root cause analysis. For example, the user 208 can construct test scenarios with the parameters with high correlation to the "No Cipher Error=FALSE" parameter 1001, such as the "TSL1.2=TRUE" parameter 1002, to determine whether the error can be reproduced.

Figure 11:
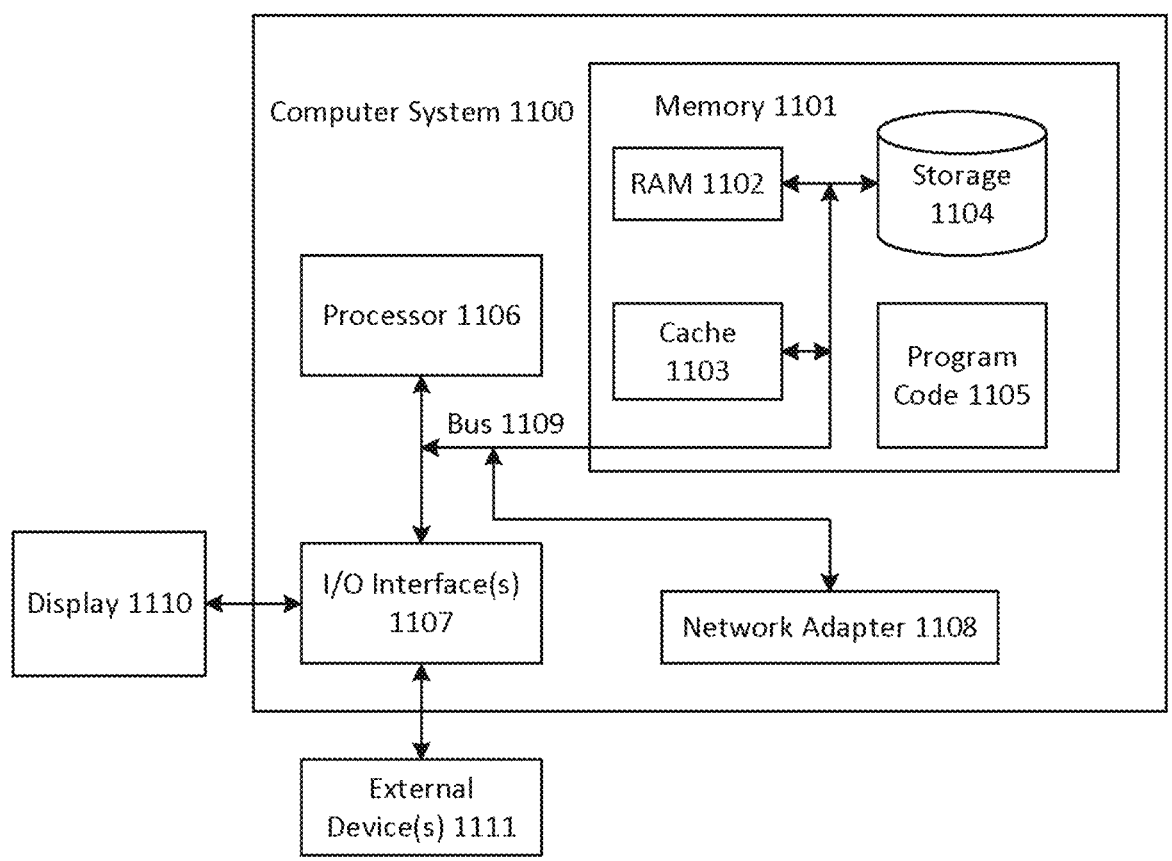
FIG. 11 illustrates a computer system according to embodiments of the present invention.

FIG. 11 illustrates a computer system, one or more of which implements the analyzer system 201, the computing system 203, and/or the computing system 206, according to embodiments of the present invention. The computer system 1100 is operationally coupled to a processor or processing units 1106, a memory 1101, and a bus 1109 that couples various system components, including the memory 1101 to the processor 1106. The bus 1109 represents one or more of any of several types of bus structure, including a memory bus or memory controller, a peripheral bus, an accelerated graphics port, and a processor or local bus using any of a variety of bus architectures. The memory 1101 may include computer readable media in the form of volatile memory, such as random access memory (RAM) 1102 or cache memory 1103, or non-volatile storage media 1104. The memory 1101 may include at least one program product having a set of at least one program code module 1105 that are configured to carry out the functions of embodiment of the present invention when executed by the processor 1106. The computer system 1100 may also communicate with one or more external devices 1111, such as a display 1110, via I/O interfaces 1107. The computer system 1100 may communicate with one or more networks via network adapter 1108.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining correlations in software application trace data, comprising:
receiving, by an analyzer system, a selection of a parameter of a plurality of parameters represented in an autoencoder;

in response, identifying, by the analyzer system, one or more hidden layer nodes in the autoencoder connected to an output node in the autoencoder corresponding to the selected parameter;
identifying, by the analyzer system, one or more other output nodes in the autoencoder connected to the one or more hidden layer nodes;
retrieving, by the analyzer system, weights assigned to edges between the one or more hidden layer nodes and the one or more other output nodes;
integrating a viewer tool with the autoencoder, where the plurality of parameters represented in the autoencoder are displayed on a user interface;
calculating, by the analyzer system, correlation values between the output node corresponding to the selected parameter and each of the other output nodes,
wherein one or more other parameters correlated with the selected parameter are graphically highlighted to represent a strength of the correlation, in response to a user clicking on an error message within the viewer tool; and
outputting, by the analyzer system, the correlation values.

2. The method of claim 1, wherein a training of the autoencoder comprises:
constructing, by the analyzer system, the autoencoder with an input layer with input nodes representing parameters in one or more training trace files, one or more hidden layers, and an output layer with output nodes reconstructing inputs to the input layer;
assigning, by the analyzer system, an initial weight to each edge between the input nodes and nodes in the one or more hidden layers and between the nodes in the one or more hidden layers and the output nodes;
inputting, by the analyzer system, input parameter values in the one or more training trace files into the autoencoder;
calculating, by the autoencoder, outputs of each node in the one or more hidden layers and outputs of each output node using an activation function and the initial weights; and
iteratively updating, by the analyzer system, the initial weights until the autoencoder calculates the outputs of each output node where reconstruction errors are minimized.

3. The method of claim 1, wherein the receiving of the selection of the parameter comprises:
inputting, by the analyzer system, parameter values from one or more trace files of a software application into the autoencoder;
adjusting, by the analyzer system, weights of the edges between nodes in the autoencoder until reconstruction errors in outputs of the autoencoder are minimized;
sending, by the analyzer system, the plurality of parameters represented in the autoencoder to a user interface; and
receiving, by the analyzer system, the selection of the parameter from the user interface.

4. The method of claim 1, wherein the calculating of the correlation values comprises:
calculating, by the analyzer system, a product of the weights of the output node corresponding to the selected parameter and each of the other output nodes.

5. The method of claim 1, wherein the one or more hidden layer nodes reside in a current layer, wherein the identifying of the other output nodes comprises:

identifying, by the analyzing system, a hidden layer node in a previous layer connected to the one or more hidden layer nodes in the current layer;
identifying, by the analyzer system, one or more intermediate hidden layer nodes in the current layer connected to the hidden layer node in the previous layer;
identifying, by the analyzer system, one or more additional output nodes connected to the one or more intermediate hidden layer nodes.

6. The method of claim 5, wherein the retrieving of the weights and the calculating of the correlation values comprise:
retrieving, by the analyzer system, weights assigned to edges between the hidden layer node in the previous layer and the one or more intermediate hidden layer nodes and between the one or more intermediate hidden layer nodes and the additional output nodes; and
calculating, by the analyzer system, additional correlation values between the output node corresponding to the selected parameter and each of the additional output nodes.

7. A computer program product for determining correlations in software application trace data, the computer program product comprising a computer readable storage medium having program instructions embodied therewith, the program instructions executable by a processor to cause the processor to:
receive a selection of a parameter of a plurality of parameters represented in an autoencoder;
in response, identify one or more hidden layer nodes in the autoencoder connected to an output node in the autoencoder corresponding to the selected parameter;
identify one or more other output nodes in the autoencoder connected to the one or more hidden layer nodes;
retrieve weights assigned to edges between the one or more hidden layer nodes and the one or more other output nodes;
integrate a viewer tool with the autoencoder, where the plurality of parameters represented in the autoencoder are displayed on a user interface;
calculate, by the analyzer system, correlation values between the output node corresponding to the selected parameter and each of the other output nodes,
wherein one or more other parameters correlated with the selected parameter are graphically highlighted to represent a strength of the correlation, in response to a user clicking on an error message within the viewer tool; and
output the correlation values.

8. The computer program product of claim 7, wherein in training the autoencoder, the processor is caused to:
construct the autoencoder with an input layer with input nodes representing parameters in one or more training trace files, one or more hidden layers, and an output layer with output nodes reconstructing inputs to the input layer;
assign an initial weight to each edge between the input nodes and nodes in the one or more hidden layers and between the nodes in the one or more hidden layers and the output nodes;
input parameter values in the one or more training trace files into the autoencoder;
calculate outputs of each node in the one or more hidden layers and outputs of each output node using an activation function and the initial weights; and iteratively updating, by the analyzer system, the initial weights until the autoencoder calculates the outputs of each output node where reconstruction errors are minimized.

9. The computer program product of claim 7, wherein in receiving the selection of the parameter, the processor is further caused to:
input parameter values from one or more trace files of a software application into the autoencoder;
adjust weights of the edges between nodes in the autoencoder until reconstruction errors in outputs of the autoencoder are minimized;
send the plurality of parameters represented in the autoencoder to a user interface; and
receive the selection of the parameter from the user interface.

10. The computer program product of claim 7, wherein in calculating the correlation values, the processor is further caused to:
calculate a product of the weights of the output node corresponding to the selected parameter and each of the other output nodes.

11. The computer program product of claim 7, wherein the one or more hidden layer nodes reside in a current layer, wherein in identifying the other output nodes, the processor is further caused to:
identify a hidden layer node in a previous layer connected to the one or more hidden layer nodes in the current layer;
identify one or more intermediate hidden layer nodes in the current layer connected to the hidden layer node in the previous layer;
identify one or more additional output nodes connected to the one or more intermediate hidden layer nodes.

12. The computer program product of claim 11, wherein in retrieving the weights and the calculating of the correlation values, the processor is caused to:
retrieve weights assigned to edges between the hidden layer node in the previous layer and the one or more intermediate hidden layer nodes and between the one or more intermediate hidden layer nodes and the additional output nodes; and
calculate additional correlation values between the output node corresponding to the selected parameter and each of the additional output nodes.

13. A system comprising:
a processor; and
a computer readable storage medium having program instructions embodied therewith, the program instructions executable by a processor to cause the processor to:
receive a selection of a parameter of a plurality of parameters represented in an autoencoder;
in response, identify one or more hidden layer nodes in the autoencoder connected to an output node in the autoencoder corresponding to the selected parameter;
identify one or more other output nodes in the autoencoder connected to the one or more hidden layer nodes;
retrieve weights assigned to edges between the one or more hidden layer nodes and the one or more other output nodes;
integrate a viewer tool with the autoencoder, where the plurality of parameters represented in the autoencoder are displayed on a user interface;
calculate, by the analyzer system, correlation values between the output node corresponding to the selected parameter and each of the other output nodes,
wherein one or more other parameters correlated with the selected parameter are graphically highlighted to represent a strength of the correlation, in response to a user clicking on an error message within the viewer tool; and
output the correlation values.

14. The system of claim 13, wherein in training the autoencoder, the processor is caused to:
construct the autoencoder with an input layer with input nodes representing parameters in one or more training trace files, one or more hidden layers, and an output layer with output nodes reconstructing inputs to the input layer;
assign an initial weight to each edge between the input nodes and nodes in the one or more hidden layers and between the nodes in the one or more hidden layers and the output nodes;
input parameter values in the one or more training trace files into the autoencoder;
calculate outputs of each node in the one or more hidden layers and outputs of each output node using an activation function and the initial weights; and
iteratively updating, by the analyzer system, the initial weights until the autoencoder calculates the outputs of each output node where reconstruction errors are minimized.

15. The system of claim 13, wherein in receiving the selection of the parameter, the processor is further caused to:
input parameter values from one or more trace files of a software application into the autoencoder;
adjust weights of the edges between nodes in the autoencoder until reconstruction errors in outputs of the autoencoder are minimized;
send the plurality of parameters represented in the autoencoder to a user interface; and
receive the selection of the parameter from the user interface.

16. The system of claim 13, wherein in calculating the correlation values, the processor is further caused to:
calculate a product of the weights of the output node corresponding to the selected parameter and each of the other output nodes.

17. The system of claim 13, wherein the one or more hidden layer nodes reside in a current layer, wherein in identifying the other output nodes, the processor is further caused to:
identify a hidden layer node in a previous layer connected to the one or more hidden layer nodes in the current layer;
identify one or more intermediate hidden layer nodes in the current layer connected to the hidden layer node in the previous layer;
identify one or more additional output nodes connected to the one or more intermediate hidden layer nodes.

18. The system of claim 17, wherein in retrieving the weights and the calculating of the correlation values, the processor is caused to:
retrieve weights assigned to edges between the hidden layer node in the previous layer and the one or more intermediate hidden layer nodes and between the one or more intermediate hidden layer nodes and the additional output nodes; and calculate additional correlation values between the output node corresponding to the selected parameter and each of the additional output nodes.

\* \* \* \* \*